(12) United States Patent
Honda et al.

(10) Patent No.: US 7,048,300 B2
(45) Date of Patent: May 23, 2006

(54) SIDE AIRBAG APPARATUS

(75) Inventors: Takashi Honda, Saitama (JP); Yusuke Nishida, Saitama (JP); Fumio Umezawa, Tochigi (JP)

(73) Assignees: Honda Giken Kogyo Kabushiki Kaisha, Tokyo (JP); TS Tech Co., Ltd., Saitama (JP)

( * ) Notice: Subject to any disclaimer, the term of this patent is extended or adjusted under 35 U.S.C. 154(b) by 159 days.

(21) Appl. No.: 10/395,452

(22) Filed: Mar. 24, 2003

(65) Prior Publication Data

US 2003/0184061 A1 Oct. 2, 2003

(30) Foreign Application Priority Data

Mar. 29, 2002 (JP) .............................. 2002-095306

(51) Int. Cl.
*B60R 21/22* (2006.01)
*B60R 21/26* (2006.01)

(52) U.S. Cl. .................................... 280/730.2; 280/740

(58) Field of Classification Search ............. 280/730.2, 280/730.1, 729, 743.1, 740
See application file for complete search history.

(56) References Cited

U.S. PATENT DOCUMENTS

| | | | | |
|---|---|---|---|---|
| 5,464,246 A | * | 11/1995 | Castro et al. ............. | 280/730.2 |
| 5,480,181 A | * | 1/1996 | Bark et al. ................ | 280/730.2 |
| 5,630,616 A | * | 5/1997 | McPherson ............... | 280/730.2 |
| 5,829,827 A | * | 11/1998 | Schaper et al. ........... | 297/216.1 |
| 6,343,810 B1 | * | 2/2002 | Breed ........................ | 280/730.2 |
| 2004/0075254 A1 | * | 4/2004 | Honda ....................... | 280/730.2 |
| 2004/0232666 A1 | * | 11/2004 | Sato et al. ................ | 280/730.2 |

FOREIGN PATENT DOCUMENTS

JP 09-323607 A 12/1997

OTHER PUBLICATIONS

RD 424046 A, Aug. 1999.*

* cited by examiner

*Primary Examiner*—Eric Culbreth
(74) *Attorney, Agent, or Firm*—Carrier, Blackman & Associates, P.C.; Joseph P. Carrier; William D. Blackman

(57) ABSTRACT

A side airbag apparatus, which deploys an airbag between an occupant of a vehicle and a sidewall of the vehicle in order to protect the occupant in the event of side collision of the vehicle. This side airbag apparatus has a first airbag and a second airbag. The first airbag has a tube-like shape, and one end of the first airbag is fixed at a seat back of a seat of the vehicle and the other end of the first airbag is fixed at a seat cushion of the seat. The second airbag has a tube-like shape, and one end of the second airbag is fixed at the seat back and the other end of the second airbag is fixed at the seat cushion. In this side airbag apparatus, the position of one end of the second airbag is higher than the position of one end of the first airbag.

17 Claims, 2 Drawing Sheets ically, the present invention relates to the

SIDE AIRBAG APPARATUS

BACKGROUND OF THE INVENTION

1. Field of the Invention

The present invention relates to the side airbag apparatus, which protects the occupant of a vehicle against injury in the event of side collision by inflating the airbag into a vehicle cabin. More specifically, the present invention relates to the side airbag apparatus, which can surely protect the occupant of a vehicle against injury by inflating airbags into a vehicle cabin from a seat of a vehicle.

2. Description of Revelant Art

The airbag apparatus, which deploys the airbag instantly and protects the occupant of a vehicle against injury in the event of collision of a vehicle, has been well known. Among this kind of airbag apparatus, the side airbag apparatus, which deploys the airbag towards the region between the occupant and the door so as to protect an occupant of a vehicle against injury, has been used against the occurrence of the side collision.

As an example of these types of conventional side airbag apparatus, there is provided the side airbag apparatus disclosed in Japanese unexamined patent publications H9-323 607.

In the conventional side airbag apparatus, since the airbag is inflated by high-pressured gas, which is supplied at constant rate, the rate of inflation and the pressure of the airbag cannot be controlled. Thereby, in case of the airbag apparatus equipped with two airbags, if one airbag deploys toward a weak part, such as a flank and the other airbag deploys toward a strong part, such as a leg, of the body, the weak part of the body may be damaged because both airbags are inflated at the same rate of inflation.

SUMMARY OF THE INVENTION

The present invention relates to the side airbag apparatus, which deploys an airbag between an occupant of a vehicle and a sidewall of said vehicle in order to protect said occupant in the event of side collision of said vehicle.

This side airbag apparatus has a first airbag and a second airbag. Each of the first airbag and the second airbag has a tube-like shape, and one end thereof is fixed at a seat back of a seat of a vehicle and the other end thereof is fixed at a seat cushion of the seat. In this side airbag apparatus, the position of one end of the second airbag is higher than the position of one end of the first airbag.

Whereby, the region ranging from a waist to a leg of the occupant is covered by both the first airbag and the second airbag and the region from a shoulder to a flank of the occupant is covered by the second airbag, when the side airbag apparatus is operated.

On this occasion, since two airbags deploys between the sidewall of the vehicle and the leg of the occupant and one airbag deploys between the sidewall and the shoulder of the occupant, the region ranging from a waist to a leg of the occupant is pushed by the higher force than the region ranging from a shoulder to a flank of the occupant. In other words, the flank part, which cannot bear to receive the high load, is pushed with weaker force than the leg part, which can bear to receive the high load, so that the physical demands on the occupant's body as a result of the collision against the fully inflated airbag can be reduced.

DETAILED DESCRIPTION OF THE PREFERRED EMBODIMENTS

The preferred embodiments of the present invention will now be described with reference to the attached drawings.

First Embodiment

Figure 1A:
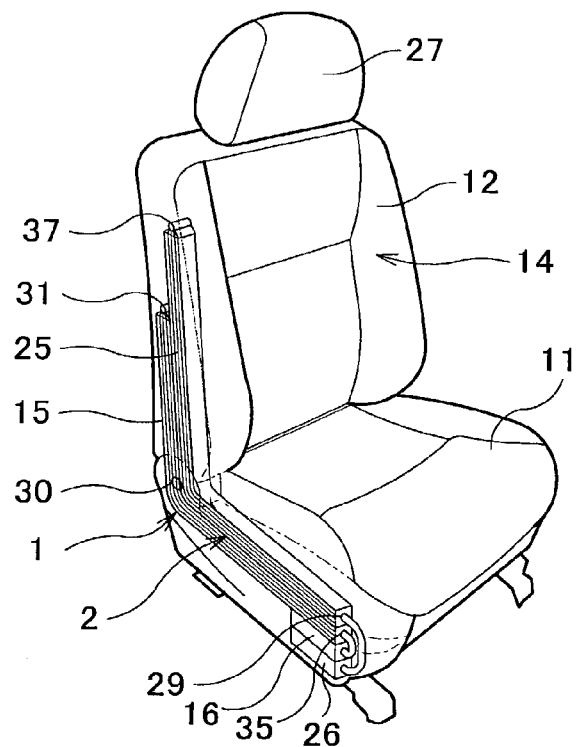
FIG. 1A is a perspective view showing the seat of a vehicle equipped with the side airbag apparatus according to the first embodiment of the invention.
Figure 1B:
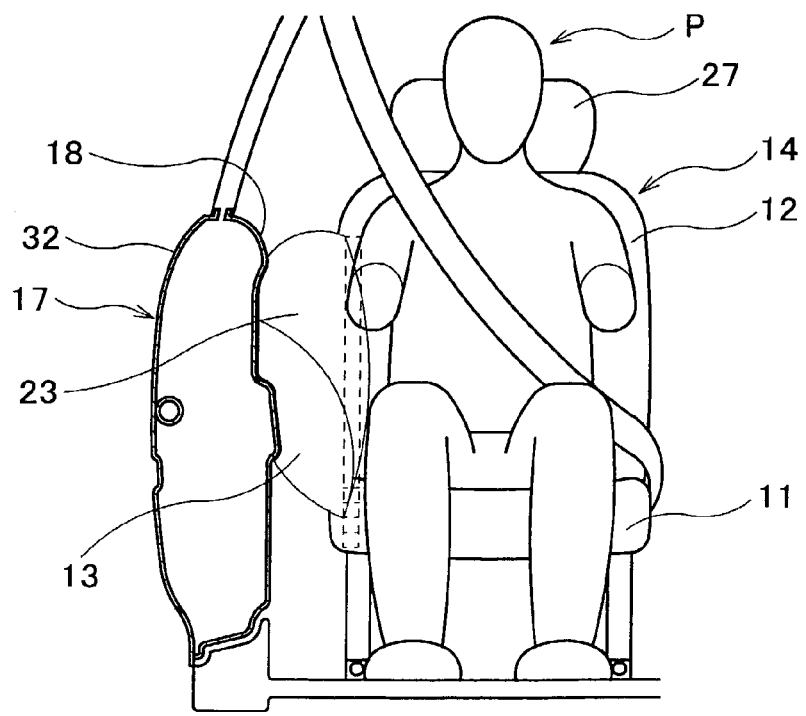
FIG. 1B is a front side view showing the inflated side airbag apparatus according to the first embodiment.

As shown in FIG. 1A and FIG. 1B, the side airbag apparatus according to the present embodiment is composed of a first airbag unit 1 and a second airbag unit 2. The second airbag unit 2 is positioned just above the first airbag unit 1, and is stored in the side part of the seat 14 together with the first airbag unit 1.

In other words, the first airbag unit 1 and the second airbag unit 2 are stored in the side part ranging from the seat back 12 to the seat cushion 11 of the seat 14.

In the present embodiment, the first airbag unit 1 and the second airbag unit 2 are provided in the side part of the seat 14 so as not to interfere with the rotation of the back last 12, which is pivotably connected with the seat cushion 11 through the hinge part 30. To be more precise, the first airbag unit 1 and the second airbag unit 2 are provided at the position outside the end part in the width direction of the vehicle of the hinge part 30.

In the present embodiment, the first airbag unit 1 and the second airbag unit 2 are provided at the outside of the hinge part 30 in order to prevent the airbag from being damaged. Because, if the position of both the first airbag unit 1 and the second airbag unit 2 overlaps with the hinge part 30, the airbag may be damaged by the excess load added to the airbag when the angle of the seat back 12 is adjusted.

The first airbag unit 1 has a module case 15, an inflator 16, and an airbag 13.

The module case 15 stores the airbag 13 in the folded condition together with the inflator 16 therein.

One end of the module case 15 is fixed at the frame (not shown) of the seat back 12, and the other end of the module case 15 is fixed at the frame (not shown) of the seat cushion 11. Thereby, one end of the module case 15 is positioned at the upper side of the seat back 12, and the other end of the module case 15 is positioned at the fore side end of the seat cushion 11.

In the present embodiment, the height of the one end of the module case 15 is established on a level with the flank of the occupant P.

The module case 15 has a tear line (not shown) at the side part thereof. This tear line is ruptured by the inflated airbag 13 when the side airbag apparatus is operated, and allows the deployment of airbag 13 outward. This module case 15 is stored in the side part of the seat 14 so that the tear line faces outward in the width direction of the vehicle.

The seat 14 equipped with the module case 15 has a seat cushion 11, a seat back 12. This seat back is pivotably connected with the seat cushion 11 through the hinge part 30 and has a headrest 27 at the top of the seat back 12.

Each of the seat cushion 11 and the seat back 12 has a scam part at the side part thereof. This seam part is easily fractured by the expansion power of the airbag 13, when the airbag 13 bursts through the tear line of the module case 15. Thus, the deployment of the airbag 13 into the vehicle cabin is allowed.

The inflator 16 spouts gas rapidly into the airbag 13 according to the seizing signal outputted from the acceleration sensor (not shown). This seizing signal is generated when the accelerated velocity of greater than the prescribed value is given to the vehicle. In other words, this seizing signal is generated when side collision with another vehicle is happening.

The airbag 13 has a tube-like shape. One end part of this airbag 13 is closed and the other end thereof connects with the gas outlet of the inflator 16.

Figure 2:
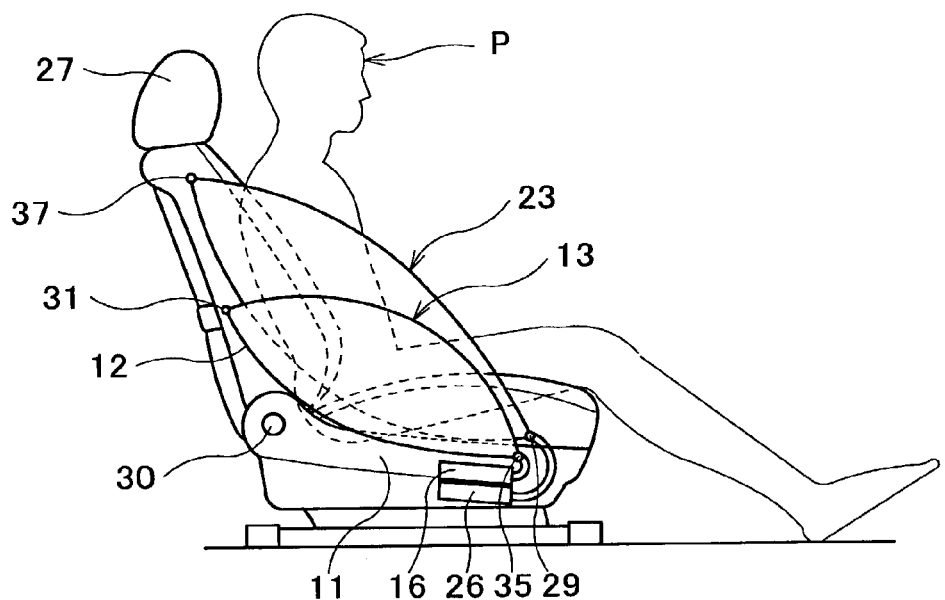
FIG. 2 is side view showing the inflated airbag of the side airbag apparatus according to the first embodiment.

As can be seen form FIG. 2, the size of the airbag 13 is settled so that the region ranging front the waist to the leg of the occupant P is covered by the fully inflated airbag 13. One end of the airbag 13 is fixed at the top end part of the module case 15, which is stored in the seat back 12, by the second fixture 31, so that an upper end of the airbag corresponds generally to the mid-height portion of the seat back 12, as shown. The other end of the airbag 13 is fixed at the front end part of the module case 15, which is stored in the seat cushion 11, by the first fixture 35.

The region between the first fixture 35 and the second fixture 31 of the airbag 13 is stored in the module case 15, which is positioned at the side part ranging from the seat back to the seat cushion of the seat 14, in the folded condition.

As mentioned above, the airbag 13 is supported at the both ends thereof by the first fixture 35 and the second fixture 31. Thus, when the side airbag apparatus is operated and the airbag 13 is inflated, the tensile force is applied to the fully inflated airbag 13. Thereby, the form retaining characteristics of the fully inflated airbag 13 is improved than the case where the airbag 13 is inflated only by gas supplied from the inflator 16.

The second airbag unit 2 also has the same construction as the first airbag module, and is composed of an airbag 23, an inflator 26, and a module case 25.

In the following explanation, the explanation about the elements, which are the same as that of the first airbag unit 1, will be omitted, because the construction of the first airbag unit 1 and the second airbag unit 2 are almost the same.

As shown in FIG. 1, the one end of the module case 25 is fixed at the frame (not shown) of the seat back 12, and the other end of the module case 25 is fixed at the frame (not shown) of the seat cushion 11.

In the present embodiment, the position of the other end of the module case 25, which is fixed at the frame (not shown) of the seat cushion 11, agrees with the position of the other end of the module case 15. The position of the one end of the module case 25, which is fixed at the frame (not shown) of the seat back 12, is higher than that of the module case 15. To be more precise, the one end of the airbag unit 2 is positioned on a level with the shoulder of the occupant P.

The module case 25 also has a tear line (not shown) at the side part thereof. This tear line is ruptured by the inflated airbag 23 when the side airbag apparatus is operated, and allows the deployment of airbag 23 the outward. This module case 25 is stored in the side part of the seat 14 so that the tear line faces outward in the width direction of the vehicle.

In the present embodiment, the module case 25 is positioned just above the module case 15 so that the fully inflated airbag 23 is positioned nearer to the occupant P than the fully inflated airbag 13 when the side airbag apparatus is operated.

The airbag 23 has a tube-like shape. One end part of this airbag 23 is closed and the other end thereof connects with the gas outlet of the inflator 26.

As can be seen from FIG. 2, the size of the airbag 23 is settled so that the part ranging from the shoulder to the leg of the occupant P is covered by the fully inflated airbag 23.

One end of the airbag 23 is fixed at the top end part of the module case 25, which is stored in the seat back 12, by the second fixture 37.

The other end of the airbag 23 is fixed at the front end part of the module case 15, which is stored in the seat cushion 11, by the first fixture 29.

The region between the first fixture 29 and the second fixture 37 of the airbag 23 is stored in the module case 25, which is positioned at the side part ranging from the seat back to the seat cushion of the seat 14, in the folded condition.

As mentioned above, the airbag 23 is supported at the both ends thereof by the first Fixture 29 and the second fixture 37. Thus, when the side airbag apparatus is operated and the airbag 23 is inflated, the tensile force is applied to the fully inflated airbag 23.

Thereby, the form retaining characteristics of the fully inflated airbag 23 is improved than the case where the airbag 23 is inflated only by gas supplied from the inflator 26.

Thereby, the form retaining characteristics of the fully inflated airbag 23 is improved than the case where the airbag 23 is inflated only by gas supplied from the inflator 16.

According to the side airbag apparatus having these constructions, as shown in FIG. 1B, the airbags 13 and 23 deploy between the door trim 18 and the occupant P when the side airbag apparatus is operated. Thus, the part ranging from waist to leg of the occupant P is protected by the horizontally adjoining airbags 13, 23, and the part ranging from the shoulder to the flank of the occupant P is protected by the airbag 23.

On this occasion, since the airbag 13 and the airbag 23 are inflated at the same rate of inflation, the portion, at which the two airbags 13 and 23 overlap each other, has a stronger elasticity than the portion, at which the two airbags 13 and 23 do not overlap each other.

Thereby, two adjoining airbags 13 and 23 prevent the sidewall part, such as the door 17 containing the outer panel 32 and the door-trim 18 of the vehicle, from bumping against the leg of the occupant P, even if the sidewall part is rushed into the vehicle cabin in the event of side collision with another vehicle.

In the present embodiment, furthermore, the region ranging from the flank to the shoulder of the occupant P is pushed by the fully inflated airbag 23 towards the inside of the vehicle cabin. On this occasion, since the region ranging from the flank to the shoulder of the occupant P is pushed by the weaker force than the leg part, the physical demands on the occupant's flank caused by the fully inflated airbags 13 and 23 can be reduced.

Next, the motion of the side airbag apparatus according to the present embodiment will be explained.

When the collision with another vehicle occurs and the accelerated velocity of greater than the predetermined value is detected by the acceleration sensor (not shown), the acceleration sensor generates the seizing signal and outputs it to the inflator 16 of the first airbag unit 1 and the inflator 26 of the second airbag unit 2, respectively.

The inflator 16 and the inflator 26 spout gas in response to the seizing signal, and supply the gas to the airbag 13 and the airbag 23, respectively.

Thus, each of the airbag 13 and 23 is inflated by the gas supplied from each of the inflator 16 and 26, and bursts through the tear line and the seam part of the seat cushion 11 and the seat back 12. Then both the inflated airbag 13 and 23 deploy into the vehicle cabin toward the region between the sidewall and the occupant P.

Since the airbag 13 and the second airbag 23 are supported at the both ends thereof by the first fixture 35 and 29 and the second fixture 31 and 37, respectively, the airbag 13 and 23 deploys into the vehicle cabin as the configuration shown in FIG. 1 and FIG. 2.

Thereby, the sidewall part, such as the door 17, does not bump against the leg of the occupant P even if the sidewall part is rushed into the vehicle cabin in the event of side collision with another vehicle.

On this occasion, since two horizontally adjoining airbags 13 and 23, which are inflated at the same rate of inflation and at the same pressure, are positioned near the leg part of the occupant P, the leg part of the occupant P is pushed towards the inside of the vehicle cabin by the stronger force than the region ranging from the shoulder to the flank of the occupant P. That is, since the flank part, which cannot bear to receive high load, is pushed with weaker force than the belly part, which can bear to receive high load, the physical demands on the occupant's body as a result of the collision against the fully inflated airbag can be reduced.

In the present embodiment, the airbag 13 is supported at the both ends thereof by the first fixture 35 and the second fixture 31 and the airbag 23 is supported at the both ends thereof by the first fixture 29 and the second fixture 35. Thus, when the airbags 13 and 23 are inflated, tensile force is applied to the fully inflated airbags 13 and 23.

This tensile force gives the improved form-retaining characteristics of the fully inflated airbags 13 and 23 than the case where the airbags 13 and 23 are inflated only by gas. In other words, since tensile force is applied to the fully inflated airbag, the fully inflated airbag is not easily deformed as compared to the airbag inflated only by gas supply.

Thereby, the occupant P can be protected against injury because the collision between the sidewall part, such as the door 17, and the occupant P is prevented by the fully inflated airbags 13 and 23.

In the present invention, furthermore, since the occupant P is pushed in the direction opposite to the sidewall part by the fully inflated airbag, the possibility of injury of the occupant in the event of side collision can be reduced.

Second Embodiment

Figure 3:
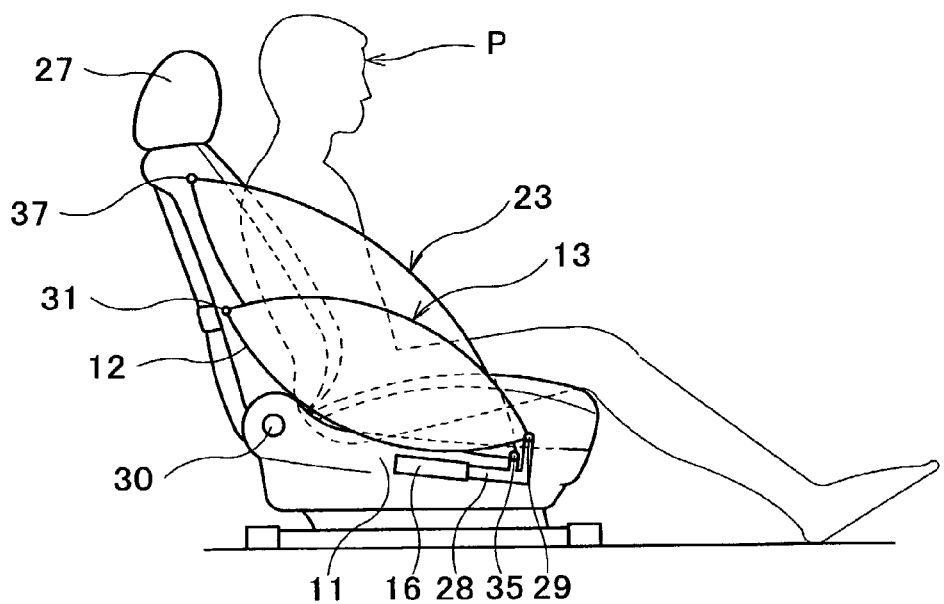
FIG. 3 is an explanatory view showing the condition where the airbag of the side airbag apparatus according to the second embodiment of the invention is fully inflated.

FIG. 3 is an explanatory view showing the condition where the airbag of the side airbag apparatus according to the second embodiment is fully inflated.

In the side airbag apparatus according to the present second embodiment, each of the airbags 13 and 13 connects with the inflator 16 via an adapter 28, which has a two-forked gas outlet.

In the present embodiment, the diameter of the gas outlet connected to the airbag 23 is made smaller than that of the gas outlet connected to the airbag 13 so that the rate of inflation of the airbag 23 becomes smaller than that of the airbag 13.

In the present second embodiment, the components of the side airbag apparatus according to the second embodiment are almost the same as that of the side airbag apparatus according to the first embodiment, except that both airbags 13 and 23 are connected to the inflator 16 through the adapter 28. Thus, the brief explanation of another components will be omitted.

In the present embodiment, since the diameter of the gas outlet connected to the airbag 23 is smaller than that of the gas outlet connected to the airbag 13, the rate of inflation of the airbag 23 becomes slower than the airbag 13. Thereby, the region ranging from the shoulder to the flank of the occupant P is pushed by the weaker load than the leg of the occupant P. Thus, the physical demands on the occupant's body, especially the flank part, which is caused as a result of the collision with the fully inflated airbag 23, can be reduced.

In the side airbag apparatus according to the second embodiment, when the collision with another vehicle occurs and the accelerated velocity of greater than the predetermined value is detected by the acceleration sensor (not shown), the acceleration sensor generates the seizing signal and outputs it to the inflator 16.

The inflator 16 spouts the gas in response to the seizing signal, and supplies the gas to the airbag 13 and the airbag 23.

Thus, each of the airbag 13 and 23 is inflated by the gas supplied from the inflator 16, and bursts through the tear line and the seam part of each of the seat cushion 11 and the seat back 12. Then both the inflated airbag 13 and 23 deploy into the vehicle cabin toward the region between the sidewall and the occupant P.

Thereby, the sidewall part, such as the door 17, does not bump against the occupant P even if the sidewall part is rushed into the vehicle cabin in the event of side collision with another vehicle.

In the present embodiment, each of the airbags 13 and 23 is connected to the inflator 16 through the adapter 28, which has a two-forked gas outlet, and both of the airbags 13 and 23 are inflated using only one inflator 16. Thus, the inflation characteristics, such as the timing of the inflation, the rate of inflation, the pressure of the fully inflated airbag, the range of deployment of the fully inflated airbag, can be adjusted using this adapter 28. Thereby, the occupant P is secured against injury in the event of side collision by adjusting the inflation characteristics in the suitable condition.

As described above, the preferred embodiments of the present invention have been explained. But the present invention is not limited to these embodiments. The present invention may be represented by the various manners.

For example, in the above described embodiments, the fully inflated airbag 13 is positioned horizontally adjoining to the fully inflated airbag 23. But it may be adoptable that the fully inflated airbag 13 is positioned vertically adjoining to the fully inflated airbag 23.

In the above described embodiments, furthermore, the second airbag unit 2 is positioned just above the first airbag unit 1. But the location of the second airbag unit 2 is not limited to this, for example, the second airbag unit 2 may be positioned just under the first airbag unit 1.

Although there have been described what are the preferred embodiments of the present invention, it will be understood that variations and modifications may be made thereto without departing from the spirit for essence of the invention.

What is claimed is:

1. A side airbag apparatus, which deploys airbags between an occupant of a vehicle and a sidewall of said vehicle in order to protect said occupant in the event of side collision of said vehicle, said side airbag apparatus comprising;
   a first airbag, which is tubular, and one end of said first airbag is fixed at a seat back of a seat of said vehicle and the other end of said first airbag is fixed at a seat cushion of said seat; and
   a second airbag, which is tubular, and one end of said second airbag is fixed at said seat back and the other end of said second airbag is fixed at an area of said seat proximate said seat cushion;
   wherein the position of said one end of said second airbag is higher than the position of said one end of said first airbag, and wherein said other end of each of the first and second airbags, respectively, is fixed at substantially the same position on the seat cushion, and wherein
   a portion of the first airbags overlies a portion of the second airbag, when viewed from the side and when the first airbag and the second airbag are deployed.

2. A side airbag apparatus according to claim 1, further comprising;
   a first inflator, which generates gas and supplies said gas to said first airbag; and
   a second inflator, which generates gas and supplies said gas to said second airbag.

3. A side airbag apparatus according to claim 2, wherein
   the position of said one end of said second airbag is at an upper side portion of said seat back, and
   the position of said one end of said first airbag is at a mid-height portion of the seat back.

4. A side airbag apparatus according to claim 1, wherein
   the position of said one end of said second airbag is at an upper side portion of said seat back, and
   the position of said one end of said first airbag is at a mid-height portion of the seat back.

5. A side airbag apparatus according to claim 1, further comprising;
   an inflator, which generates gas and supplies said gas to said first airbag and said second airbag; and
   an adapter which has a first gas outlet and a second gas outlet;
   wherein said first airbag is connected to said inflator through said first gas outlet, and said second airbag is connected to said inflator through said second gas outlet.

6. A side airbag apparatus according to claim 5, wherein
   the diameter of said second gas outlet is smaller than said first gas outlet.

7. A side airbag apparatus according to claim 5, wherein
   the position of said one end of said second airbag is at an upper side portion of said seat back, and
   the position of said one end of said first airbag is at a mid-height portion of the seat back.

8. A side airbag apparatus according to claim 5, wherein
   the position of said one end of said second airbag is at an upper side portion of said seat back, and
   the position of said one end of said first airbag is at a mid-height portion of the seat back such that the position of said one end of said first airbag is vertically spaced apart from the position of said one end of said second airbag.

9. A side airbag apparatus according to claim 1, wherein
   said second airbag pushes on a flank portion of an occupant when deployed, while the first airbag and said second airbag push on a leg portion of an occupant when deployed.

10. A side airbag apparatus according to claim 1, wherein
    the position of said one end of said second airbag is at an upper side portion of said seat back, and
    the position of said one end of said first airbag is at a mid-height portion of the seat back such that the position of said one end of said first airbag is vertically spaced apart from the position of said one end of said second airbag.

11. A side airbag apparatus, which deploys airbags between an occupant of a vehicle and a sidewall of said vehicle in order to protect said occupant in the event of side collision of said vehicle, said side airbag apparatus comprising;
    a first airbag unit, which has
       a first airbag, which covers a region ranging from a waist to a leg of said occupant,
       a first inflator, which generates gas for inflating said first airbag and supplies said gas to said first airbag, and
       a first module case, which stores said first airbag together with said first inflator therein; and
    a second airbag unit, which has
       a second airbag, which covers a region ranging from a shoulder to the leg of said occupant;
       a second inflator, which generates gas for inflating said second airbag and supplies said gas to said second airbag, and
       a second module case, which stores said second airbag together with said second inflator therein;
    wherein said first airbag unit and said second airbag unit are stored in a seat of said vehicle, and wherein
    a portion of the first airbag overlies a portion of the second airbag when viewed from the side when the first airbag and the second airbag are deployed.

12. A side airbag apparatus according to claim 11, wherein
    said first airbag and said second airbag respectively, are each formed in the shape of a tube, one end of each of the first and second airbags, respectively, is fixed at a seat back portion of said seat, and the other end of both the first and second airbags is fixed at a fore end of said seat in an area proximate said seat cushion thereof.

13. A side airbag apparatus according to claim 12, wherein
    the position of said one end of said second airbag is at an upper side portion of said seat back, and
    the position of said one end of said first airbag is at a mid-height portion of the seat back, and
    said other end of both the first and second airbags is fixed at substantially the same position on the seat cushion.

14. A side airbag apparatus according to claim 12, wherein
    said first airbag unit and said second airbag unit are provided near an end of a hinge portion of the seat facing toward a widthwise outside direction of the vehicle, so as to not interfere with the hinge portion, which pivotably connects said seat back with said seat cushion.

15. A side airbag apparatus according to claim 11, wherein
    said second airbag pushes on a flank portion of an occupant when deployed, while said first airbag and the second airbag push on a leg portion of an occupant when deployed.

16. A side airbag apparatus according to claim 11, wherein the portion of the first airbag which overlies the portion of the second airbag when viewed from the side is deployed at a mid-height location of the seat back.

17. A side airbag apparatus, which deploys airbags between an occupant of a vehicle and a sidewall of said vehicle in order to protect said occupant in the event of a side collision of said vehicle, said side airbag apparatus comprising:

a first airbag having a tubular shape, one end thereof being fixed at a seat back of a seat of said vehicle and the other end thereof being fixed at a seat cushion of said seat;

a second airbag having a tubular shape, one end thereof being fixed at said seat back, the other end thereof being fixed at an area of said seat proximate said seat cushion, and a position of said one end of said second airbag being higher than a position of said one end of said first airbag;

an inflator which generates gas and supplies said gas to said first airbag and said second airbag; and an adaptor having a first gas outlet and a second gas outlet;

said first airbag being connected to said inflator through said first gas outlet, and said second airbag being connected to said inflator through said second gas outlet, and the diameter of said second gas outlet being smaller than that of said first gas outlet.

* * * * *